June 4, 1963 A. G. SCHRAMM 3,092,273

SELF-LOADING AND DUMPING TRAILER

Filed July 24, 1961 5 Sheets-Sheet 1

INVENTOR.
Arthur G. Schramm
BY Scott L. Norvell
Atty.

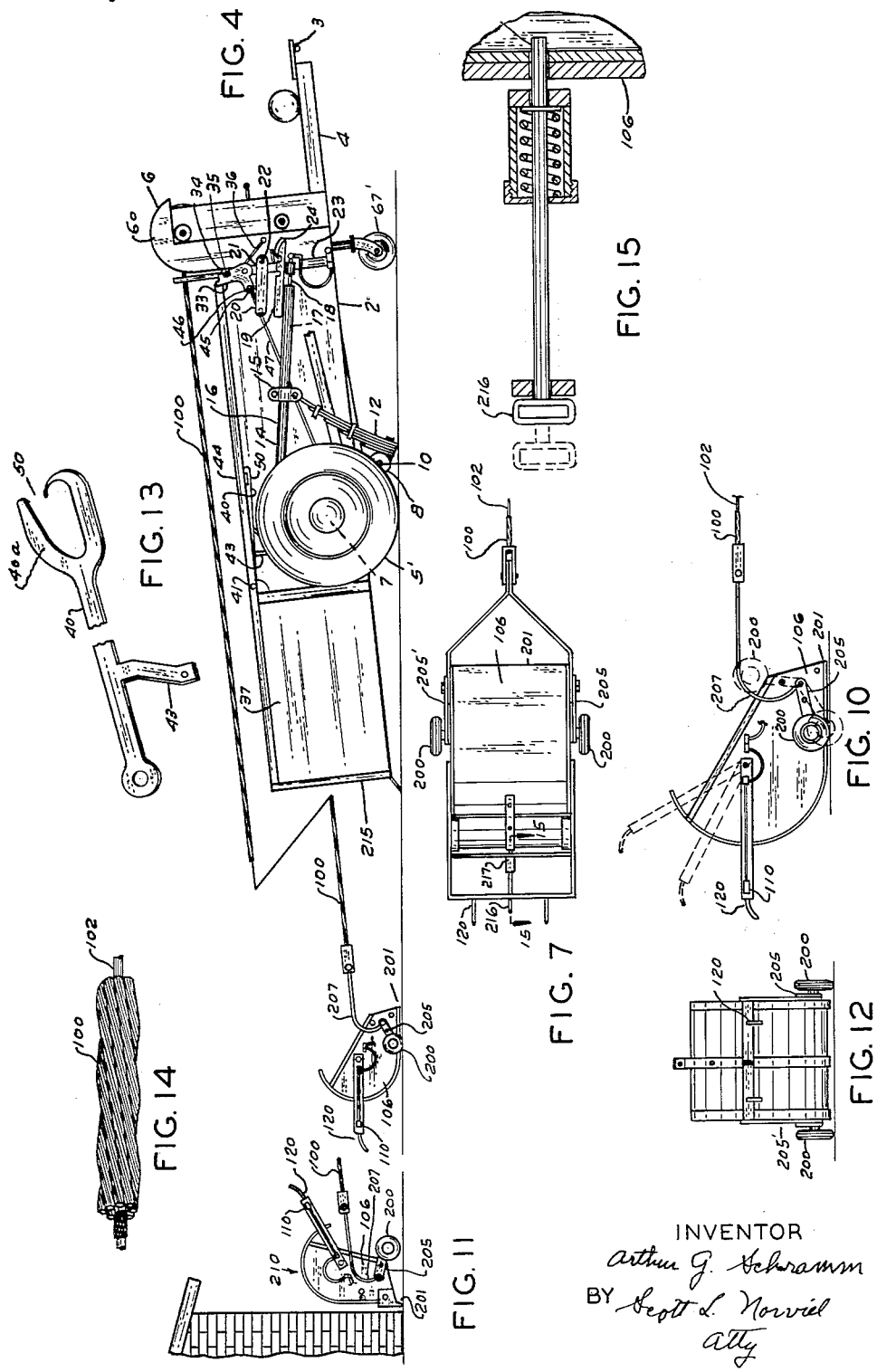

June 4, 1963 A. G. SCHRAMM 3,092,273
SELF-LOADING AND DUMPING TRAILER
Filed July 24, 1961 5 Sheets-Sheet 4

INVENTOR.
Arthur G. Schramm
BY Scott L. Norvied
Atty.

June 4, 1963     A. G. SCHRAMM     3,092,273
SELF-LOADING AND DUMPING TRAILER
Filed July 24, 1961     5 Sheets-Sheet 5
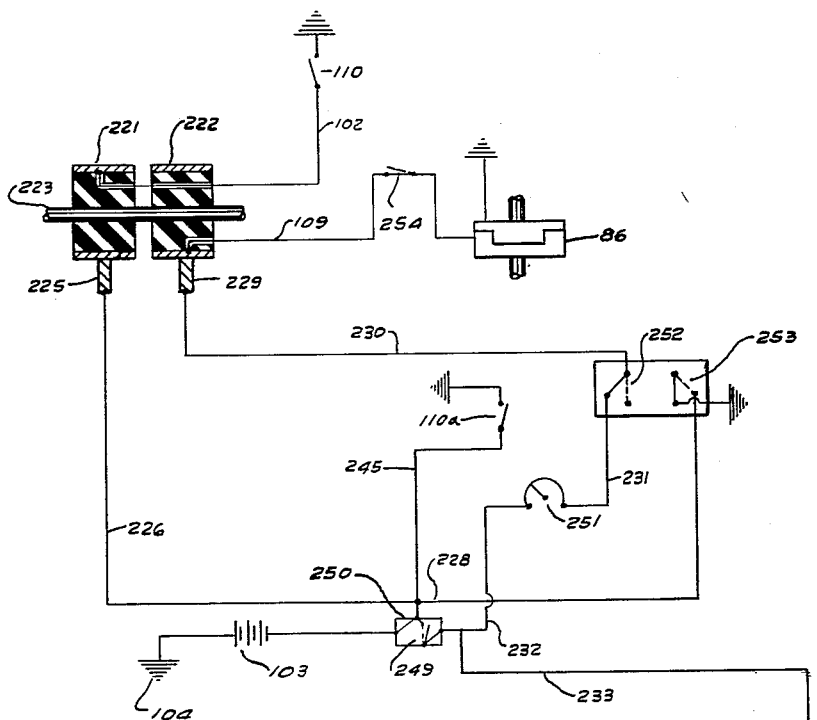
FIG. 16
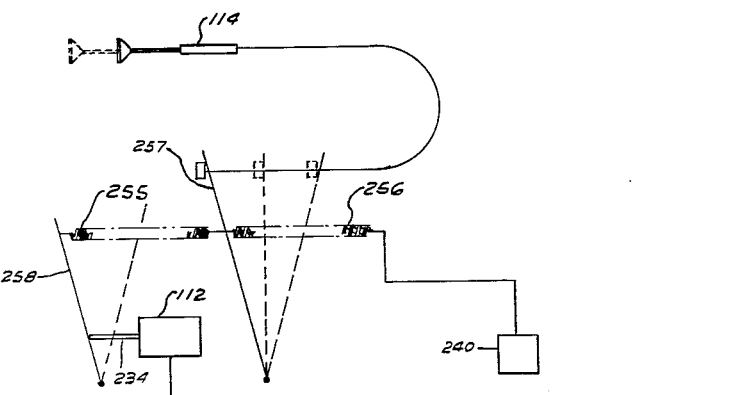
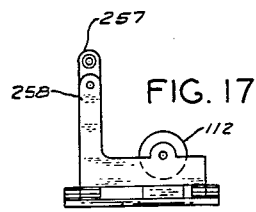
FIG. 17
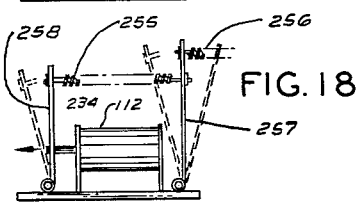
FIG. 18
INVENTOR.
Arthur G. Schramm
BY Scott L. Norvel
Atty.

United States Patent Office 3,092,273
Patented June 4, 1963

3,092,273
SELF-LOADING AND DUMPING TRAILER
Arthur G. Schramm, 215 N. 28th St., Phoenix, Ariz.
Filed July 24, 1961, Ser. No. 126,208
6 Claims. (Cl. 214—504)

This invention pertains to a self-loading and dumping trailer.

One of the objects of the invention is to provide a trailer having self-contained means that will enable it to be loaded without the use of other apparatus, and mechanism whereby it may be tilted to dump loose materials, such as sand, gravel, or the like.

Still another object is to provide a trailer which has self-contained outer mechanism which will enable the operator to load the trailer bed with loose material, such as sand, gravel, earth, or the like, by using a scoop which is drawn into the trailer bed by a power driven winch contained in the body of the trailer.

Still another object is to provide mechanism whereby the trailer bed may be moved automatically by hydraulic power means from a level running position to an elevated dock position and to a lowered loading position.

Another object is to provide a means by which an operator of the device has complete control of the movement of the cable and loading bucket from a position at the outer end of the pull in cable.

A further object includes means for tilting the trailer bed on a frame so that it is tilted by power driven means to completely dump all material contained in the bed at any desired position.

Other objects will appear hereinafter.

I attain the foregoing objects by means of the mechanism, parts and combinations of parts shown in the accompanying drawings, in which—

FIGURE 4 is a side elevational view of the trailer in lowered loading position;

FIGURE 7 is a plan view of the loading scraper bucket;

FIGURE 10 is a side elevational view of the trailer scoop shown in normal operating position;

FIGURE 11 is a view of the scoop, drawn on a smaller scale and showing various movements for scooping earth or similar materials wherein the trailer is close to a wall, or the like;

FIGURE 12 is a rear elevational view of the scoop as shown in FIGURE 10;

FIGURE 13 is a perspective view of the arm and pivot hook for connecting the ram to the bed for dumping;

FIGURE 14 is a fragmental section of the cable used to control the scoop;

FIGURE 15 is a sectional elevational view of a latch used to hold the bucket handles in various positions, taken on line 15—15 of FIGURE 7;

FIGURE 16 is an electrical diagram showing the wiring of the control circuits used to operate the scoop and throttle speeds;

FIGURE 17 is a front elevational view of the solenoid plunger used to control the throttle or engine speeds; and FIGURE 18 is a side elevational view thereof.

Figure 1:
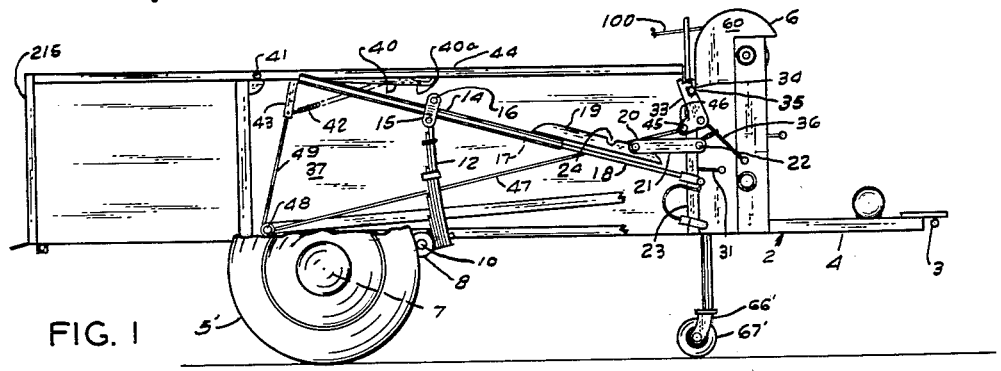
FIGURE 1 is a side elevational view of a trailer embodying my improvements, shown in level riding position.

As shown in FIGURES 1, 2, 3 and 4, the main parts of the trailer consist of a bed frame 2 having a traier hitch knob 3 at the front which is attached to an angular draw bar portion 4. The body and other parts are all supported on this main frame.

The trailer runs on riding wheels 5 and 5', being the left and right riding wheels, respectively. These wheels are each supported on stub shafts 7 supported in the outer free ends of arms 8 and 8'. The wheel arms are pivoted at 10 to the frame 2 and are held in position by springs 12. The outer ends of the springs are connected to sleeves 14 by clevis heads 15. These parts are on each side of frame 2. In and out motion of the cylinder sleeves is produced by motion of a piston which is connected to sleeves 14 at their outer ends and in turn, operated by oil pressure in cylinder 18. The above structure is not new itself and is common to similar structure shown in my previous patents.

Figure 8:
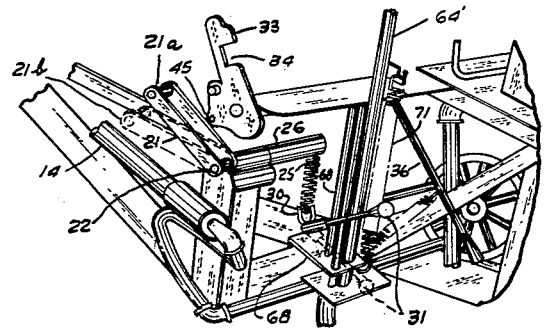
FIGURE 8 is a perspective view of a front corner of the trailer bed showing details of the latching mechanism for holding the bed in place on the sub-frame, and hydraulic ram latching mechanism.

In order to hold the cylinder sleeves 14 in place with reference to the cylinder 18, I provide the latch bar 19 adapted to be engaged by the cross thimble 20 of latch 21. This latch is pivoted by a pin 22 at its front, which is, in turn, supported on vertical frame member 23. The thimble may be made to engage any of the notches 24 on latch bar 19 by a resilient strain holder 25, shown in detail in FIGURE 8. It is to be noted that the latch pins of each of the latches on each side of the body are keyed to sleeves 26. These sleeves will rotate as the latch moves upward or downward from the raised position shown at 21a to the lowered position indicated by dotted outlines 21b. In the raised position the latches are released from notches 24 and in the lowered position the thimble 20 is resiliently held in the notches by action of the spring 25, which is attached to sleeves 26 and extends therefrom radially with its lower end joined to the yoke 30 which is pivotally mounted on the subframe 2 and provided with an operating handle 31. Movement of the handle will move the yoke 30 beyond dead center and place the strain of spring 25 on either the forward or rearward side of sleeve 26.

It is to be understood that, whereas I have described the above structure as it appears on the right hand side of the body there is a left hand counter part on the left side of the body and the left hand parts are marked with a prime number wherever they show.

Figure 3:
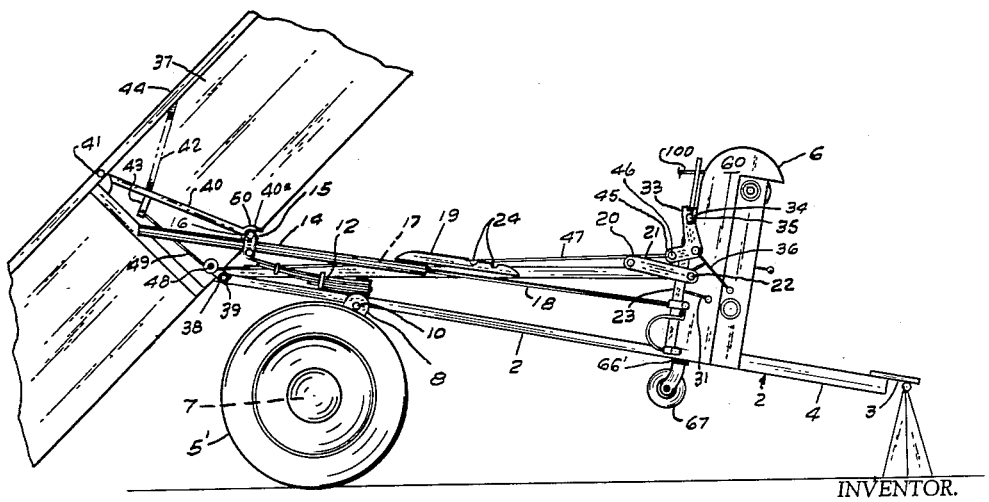
FIGURE 3 is a side elevational view of the trailer in dumping position.

In addition to the above latch there is a body hook 33 which has a notch 34 to engage a pin 35 on the forward end of the body 37 and hold its front end downward and in contact with the fore part of the bed frame 2. Hooks 33 are positioned on the right and left sides of the body, respectively, and are operated by levers 36 on the right hand portion of the body and 36' on the left hand portion of the body. Movement of these latches to the rear releases pins 35 and permits the body 37 to tilt to the rear as shown in FIGURE 3.

Figure 2:
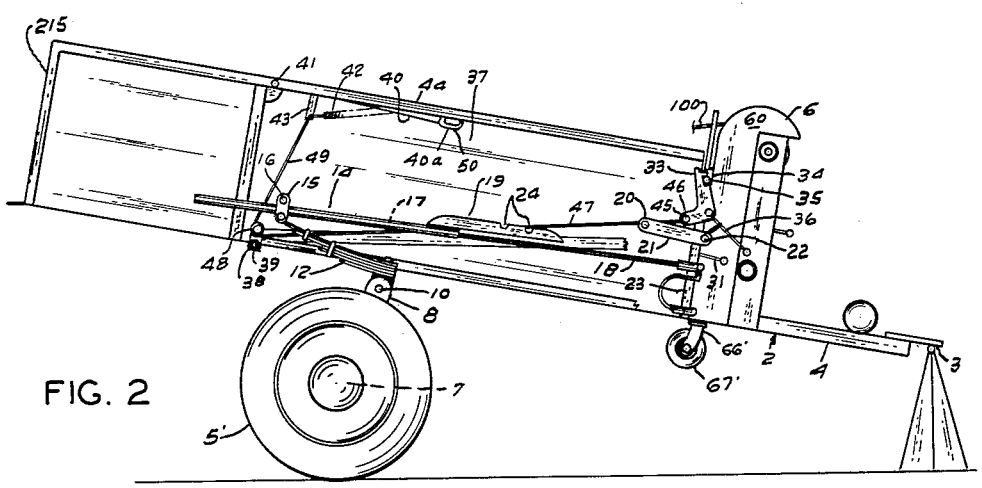
FIGURE 2 is a side elevational view of the same trailer shown with the rear end elevated to a dock unloading position.

The body 37 is pivotally supported on pivot shaft 38 which operates in a thimble 39 on the right hand side of the body and a similar thimble 39' operates on the left hand side of the body. The position of this shaft 38 is such that the body is normally heavy at its front end and normally tends to assume the position shown in FIGURES 1 and 2. For this reason it is necessary to apply power, for dumping, to overcome the front end overweight of the body 37. This is done by the pivoted hook 40. This hook is pivoted on pin 41 at its rear and is held in raised position, as shown in FIGURES 1 and 2 by a spring 42 which operates between the arm 43 and the upper edge of the body as at 44. The hook 33 has a rearwardly extending arm portion 45 which includes pin 46. Cable 47 is attached to this pin 46 and extends rearwardly to pulley 48, around which it is bent to provide the upwardly extending portion 49. The end of the cable is then attached to the arm 43 on hook 40. Movement of the latch will cause the cable to pull the hook down to engaging position, as shown in FIGURE 3, where the double hook 50 engages the cross pin 16 of clevis 15.

Figure 5:
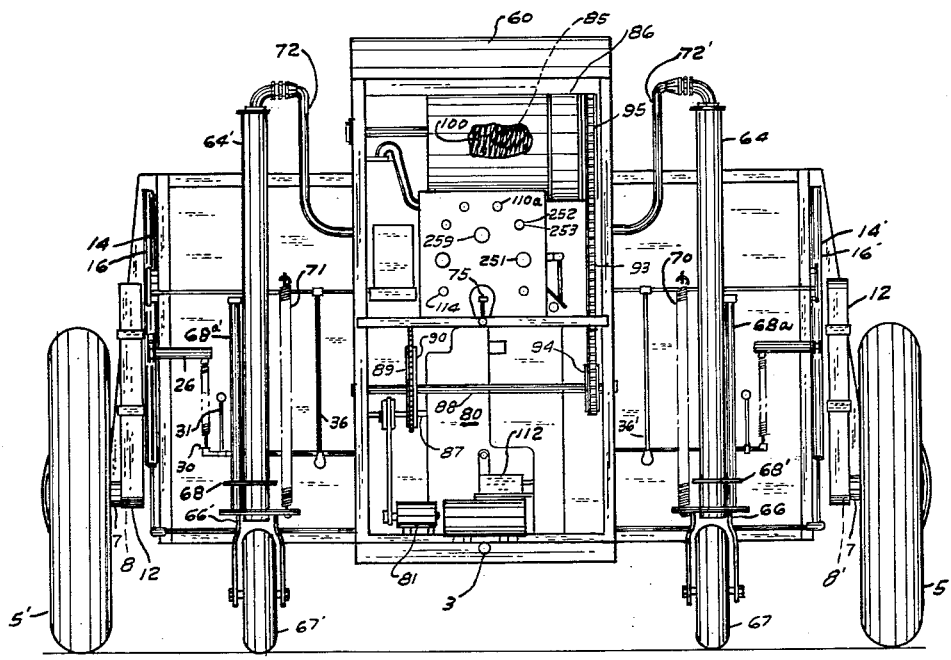
FIGURE 5 is a front elevational view of the trailer.
Figure 6:
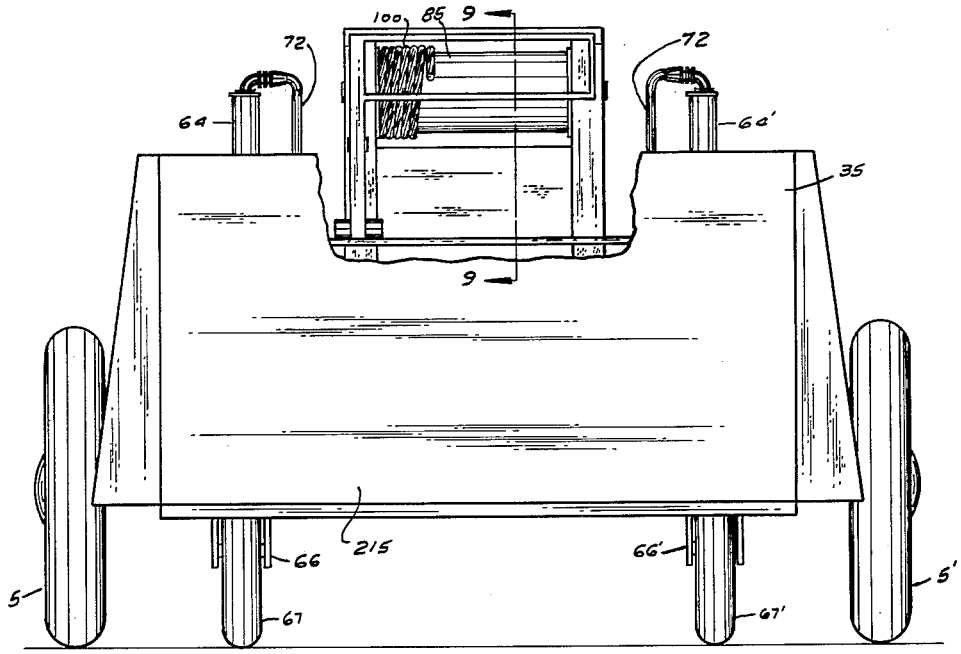
FIGURE 6 is a rear elevational view of the trailer.

Within the housing 60 which is attached to the front end of the bed frame 2, there is mechanism for operating oil pumps to activate cylinders 18 and 18', also cylinders 64 and 64' attached to the front edge of the trailer body. These cylinders are positioned and operate vertically to push fork mechanisms 66 and 66' downward. These forks carry dolly wheels 67 and 67' which are used in balancing the trailer body fore and aft when it is attached to a tractive vehicle. The motion of the forks 66 and 66' is steady and guided by rods 68a and 68a' operating in guides 68 and 68'. These rods also act as stops to limit the downward motion of the forks. Return springs 70 and 71 are used to return or draw up the forks to the position shown in FIGURE 2 (for example) when the front end of the draw bar portion of the trailer body is otherwise adequately supported. The position of these dolly wheels, when extended downwardly, is shown in FIGURE 1. In FIGURE 5 the front view of the trailer body shows the dolly wheels in supporting position. The oil is supplied to the tops of cylinders 64 and 64' through piping 72 and 72'. Oil under limited pressure is introduced into these cylinders through master valve 75, through valve 259 which diverts oil to the main lifting rams of trailer and also to rams 64 and 64' for lifting vertical trailer on and off of the pulling vehicle, and is switched to other piping and released into a storage tank when it is desired to retract the dolly wheel forks, or lower the trailer bed.

Within the canopy 6 there is also a motor 80 of the small air cooled internal combustion type and this motor is used to drive the generator 81, as well as the oil pumps above mentioned and to drive an oil pump for the intermittent operation of cylinders 18, as above mentioned and also to drive the winch drum 85 through the electric clutch 86. When the clutch is engaged through circuits and mechanism, hereinafter described, power from engine shaft 87 is transmitted to jack shaft 88 by a chain 89 running over sprocket wheel 90. Jack shaft 88 then drives the drum 85 through the clutch 86 by means of chain 93 running over sprockets 94 and 95.

Figure 9:
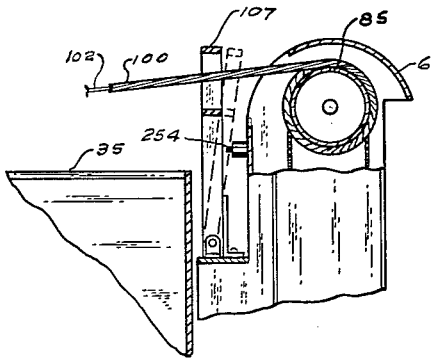
FIGURE 9 is a fragmentary view of the upper portion of the front end of the trailer showing the cable winch, showing an automatic cutoff stop switch.

The cable 100 is wound on drum 85 when the drum shaft is turned clockwise, as viewed in FIGURE 9. The cable 100 is shown in an enlarged view in FIGURE 14. This section also illustrates that the core of the cable is an insulated conductor wire 102. This conductor wire is used to control the action of the motor and clutch 86.

Numeral 106 indicates in general a scraper which is used to scrape or otherwise used to move dirt or similar material into the body of the trailer when it is in lowered position as shown in FIGURE 4.

With the trailer lowered, as shown in FIGURE 4, and the motor 80 operating the closing of the circuit through conductor 109 will engage the clutch 86 as shown in the diagrammatic view in FIGURE 16. This operation will then cause the winch drum 85 to wind up cable 100 and draw the scarper toward the trailer body. At the same time this closing of the switch 110 on the scraper body also throws a current through the solenoid 112 and this, in turn, causes the motor throttle to open so that the motor picks up sufficient speed to furnish the power necessary to operate the scraper. This is done by the circuits shown in FIGURE 16 and the apparatus shown in FIGURES 17 and 18.

In FIGURE 16 a manual control 114 is shown which will regulate the speed of the motor when the throttle is opened. That is, when the switch 110 is closed and the motor is speeded up it is still limited by the setting of the throttle control 114.

The scraper 106 is provided with small dolly wheels 200 which enable the operator to run the scraper back away from the body with a minimum of effort. When the switch 110 is closed the front edge 201 of the scraper is moved over the ground and thus the scooping or scraping action is obtained. After the scraper is drawn into the trailer body 37 it is raised by handles 120. This dumps the load on the trailer bed and switch 110 is then opened and the scraper rolls backwards on the dolly wheels 200. It is to be noticed that the dolly wheels 200 are mounted on a pair of struts 205 and 205'. This mounting permits the hook-like attachment 207, which connects cable 100 to the scraper, to either pull the scraper with its cutting edge 201 first or to pull the scraper in a vertical position, as shown at 210, FIGURE 11.

After the body is filled the scraper is drawn into the body and disconnected if desired. The trailer body is then raised using the mechanism above described and by applying oil pressure to cylinders 18 and 18'. With the trailer body raised to the position shown in either FIGURE 1 or FIGURE 2, the body may be dumped by releasing latch 33 and then applying pressure to the fore part of the trailer body by a further rearward movement of the cylinder sleeves 14 and 14'. This movement engages the cross pin 16 in clevis head 15 with the notch 40a of the hook 40. This pressure over balances the load in the trailer body and tilts it to the position shown in FIGURE 3. The load is then dumped as desired. A tail gate 215 may be added to the trailer body as desired and coupled and uncoupled by any conventional means.

In FIGURE 15 a latch 216 is shown which is used to hold the handles 120 in desired positions. The operation of handle 216 will release the pin 217 from the parts held. When ground switch 110 is closed current is directed through conductor line 102 to ring 221 mounted on cable drum shaft 223 through brush 225 through conductor line 226 to solenoid switch 250. Solenoid switch 250 is energized by the battery 103 through ground 104, shown on FIGURE 16. This current activates solenoid 250 and closes solenoid switch 249. Closed solenoid switch 249 directs current through conductor line 232 to load control or rheostat 251 through conductor line 231 to closed switch 252 through conductor line 230 through brush 229 to ring 222 mounted on cable drum shaft 223 through conductor line 109 through closed switch 254 to clutch 86.

Closed solenoid switch 249 in solenoid 250 also directs current through conductor line 233 to plunger type solenoid 112 to activate the speed of the engine through its various controls.

When the winding in solenoid 112 is energized it forces the left end of the core 234 outward so that it contacts hinged plate 258. This motion is communicated through spring 255 to a hinged plate 257. This plate has a spring 256 pulling opposite to spring 255 so that the motion of the solenoid can be transmitted to and held relative to the desired throttle opening by the throttle setting control 114. The arrangement of having the spring 255 attached to the plate 258 instead of having the core 234 connected direct to the spring 256, is used so that each time the solenoid winding is energized it will draw the core 234 to the limit of its travel and thus use the energy supplied. This prevents the burning out of the solenoid winding.

The throttle is also controlled by governor 240 which is on the engine and operates according to the usual practice.

Switch 253 is a ground switch which is used to activate solenoid 112, whereas switch 252 on the same base is termed the clutch switch which operates the clutch 86 through conductor 230, brush 229, ring 222, conductor 109 and closed switch 254. Switch 252 is always open when switch 253 is closed. This is accomplished by a single throw double pole switch. This operation opens the circuit to clutch 86 and closes the circuit to solenoid 112 so as to control the engine speeds for operating the hydraulics of the unit when the clutch 86 and cable 100 are not being operated. Switches 252 and 253 are mounted on the control panel.

Conductor line 245 and ground switch 110a mounted on control panel activities circuit through solenoid switch 249 parallel with ground switch 110 mounted on scraper handle.

Safety switch 254 is used to cut out the operation of the clutch 86, when and if a short circuit should occur in any of the conductor lines. Should a short circuit occur in any of the conductor lines, and scraper cable travels farther than intended, the scraper 106 will move against safety bar 107, which will open the normally closed safety switch 254.

From the foregoing it will be observed that I have provided a trailer having a subframe running on riding wheels which may be raised and lowered with respect to the subframe so that the subframe may be consequently raised and lowered. Hydraulic mechanism is provided to accomplish this action. The subframe may be held in any position desired from fully raised to fully lowered position. I then provide a trailer box or body which is pivotally mounted on the subframe and is balanced so that it will normally stay in a level riding position. In connection with the hydraulic rams which raise and lower the trailer riding mechanism, I provide means to tilt the trailer box body to a dumping position when desired. In addition to this I provide mechanism in the forward end of the trailer which will hold the forward end horizontal when it is disconnected from the tractive vehicle and also mechanism for operating a cable which, in turn, operates a scraper well adapted to draw dirt or other substance into the bed of the trailer box body. All the foregoing should be considered as a mobile unit to be used in construction work and the like in moving, hauling, dumping dirt or other materials.

I claim:

1. A self-loading and dumping trailer comprising a body frame, riding wheels supporting said frame, mechanism for raising and lowering said frame relative to said riding wheels including hydraulic cylinders and pistons, a power means on said frame, hydraulic jack means for raising and lowering the front end of said trailer frame, a body tiltably mounted on said frame to move from a horizontal riding position to a rearwardly tilted dumping position, control mechanism on the front end of said frame for producing oil under pressure from said power means, a control panel having means for directing oil under pressure to said hydraulic trailer frame raising and lowering mechanism and to said hydraulic jack means for raising and lowering the front end of said trailer frame, means, operating in conjunction with said hydraulic raising and lowering mechanism for tilting said body on said frame, said means including a hook for engaging transverse portions of said hydraulic raising and lowering mechanism and hook means for latchably holding said tilting body in a horizontal position or releasing it, and means in conjunction with said control panel for hydraulically controlling the lowering and raising of said body on said frame and for tilting the body when desired for dumping and for stabilizing said frame when said body is operated.

2. A self-loading and dumping trailer comprising a body frame, riding wheels supporting said frame, mechanism for raising and lowering said frame relative to said riding wheels including hydraulic cylinders and pistons, a power means on said frame, hydraulic jack means for raising and lowering the front end of said trailer frame, a body tiltably mounted on said frame to move from a horizontal riding position to a rearwardly tilted dumping position, control mechanism on the front end of said frame for producing oil under pressure from said power means, a control panel having means for directing oil under pressure to said hydraulic trailer frame raising and lowering mechanism and to said hydraulic jack means for raising and lowering the front end of said trailer frame, means, operating in conjunction with said hydraulic raising and lowering mechanism for tilting said bed on said frame, said means including a hook for engaging transverse portions of said hydraulic raising and lowering mechanism and hook means for latchably holding said tilting body in a horizontal position or releasing it, and means in conjunction with said control panel for hydraulically controlling the lowering and raising of said body on said frame and for tilting the body when desired for dumping and for stabilizing said frame when said body is operated, and means including a winch and a cable wound thereon and adapted to extend to the rear of said trailer bed, a scoop attached to the end of said cable, said cable having a centrally disposed electric conductor, switch means on said scoop for closing a circuit through said conductor in said cable and electric wiring means for speeding up said power source and applying power to said winch to wind up said cable when desired; said switch means being operative from said panel or from said scoop.

3. The device described in claim 2 wherein electrical circuits are connected to the controls of said power means to increase the power when said hydraulic jack means are operated, and means for increasing the power when said cable winch is operated; said means including switches on said control panel, valves on said control panel to distribute hydraulic fluid under pressure, a hydraulic pump connected to said engine, and an electrically operated clutch on said power means controlled by electrical circuits including switches on said panel and said scoop.

4. The mechanism and devices described in claim 2, in combination with said winch, safety cutoff mechanism comprising a normally closed switch connected in series with wiring leading to a source of electrical energy and the electromagnetic clutch operatively connected to said winch, a pivotally mounted safety bar in said body frame adapted to open said switch when pivoted to cutoff position; said safety bar being disposed in said body to move to power cutoff position when contacted by said scraper when it is drawn into said body beyond a predetermined position.

5. A self-loading and dumping trailer comprising a body frame, riding wheels supporting said frame, mechanism for raising and lowering said frame relative to said riding wheels including hydraulic cylinders and pistons, a power means on said frame, hydraulic jack means for raising and lowering the front end of said trailer frame, a body tiltably mounted on said frame disposed to move from a horizontal riding position to a rearwardly tilted dumping position, control mechanism on the front end of said frame for producing oil under pressure from said power means, a control panel having valve means for directing oil under pressure to said hydraulic jack means for raising and lowering said frame, and to said hydraulic jack means for raising and lowering the front end of said trailer frame, means, operating in conjunction with said hydraulic raising and lowering mechanism, for tilting said body on said frame, said means including laterally disposed hook links pivotally supported on the upper side parts of said body for engaging transverse portions of said hydraulic jack wheel raising and lowering mechanism, and latch hook means on the front end of said frame for latchably holding said tilting frame body in a horizontal position or releasing it; said latch hook means being attached by cables to said hook links to move said hook links co-incidentally with said latch hooks so that, after release, said body can be tilted for dumping by power applied through said hook links from said riding wheel raising and lowering mechanism.

6. In the mechanism described in claim 2, control means for said engine of said power means comprising a manually positionable engine speed limiting control arm, a solenoid connected in circuit with a source of electrical energy and the several functional electrical controls of said device; said solenoid having a plunger core resiliently connected to said control arm and adapted to move said control arm to each of several pre-set control positions when said plunger core is drawn into said solenoid.

References Cited in the file of this patent

UNITED STATES PATENTS

| | | |
|---|---|---|
| 2,452,267 | Schramm | Oct. 26, 1948 |
| 2,603,371 | Hershey | July 15, 1952 |
| 2,609,953 | Schramm | Sept. 9, 1952 |
| 2,835,401 | Byrd | May 20, 1958 |